United States Patent
Glahn et al.

(10) Patent No.: US 12,116,900 B2
(45) Date of Patent: Oct. 15, 2024

(54) BUFFER AIR SYSTEM FOR A BEARING COMPARTMENT

(71) Applicant: Raytheon Technologies Corporation, Farmington, CT (US)

(72) Inventors: Jorn A. Glahn, Manchester, CT (US); Gregory M. Dooley, Glastonbury, CT (US); Collin P. Fitzgerald, S. Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/105,623

(22) Filed: Feb. 3, 2023

(65) Prior Publication Data

US 2024/0263567 A1    Aug. 8, 2024

(51) Int. Cl.
*F01D 25/16*    (2006.01)
(52) U.S. Cl.
CPC .......... *F01D 25/16* (2013.01); *F05D 2220/32* (2013.01); *F05D 2240/54* (2013.01); *F05D 2240/55* (2013.01)
(58) Field of Classification Search
CPC .. F01D 25/16; F05D 2220/32; F05D 2240/54; F05D 2240/55
See application file for complete search history.

(56) References Cited

U.S. PATENT DOCUMENTS

| | | | | |
|---|---|---|---|---|
| 4,645,415 A | * | 2/1987 | Hovan | F01D 25/125 60/39.83 |
| 8,366,382 B1 | | 2/2013 | Muldoon | |
| 11,098,644 B2 | * | 8/2021 | Munsell | F02C 9/18 |
| 2013/0177406 A1 | | 7/2013 | Heaton | |
| 2016/0208697 A1 | | 7/2016 | Muldoon | |
| 2018/0291816 A1 | | 10/2018 | Parnin | |
| 2018/0340469 A1 | | 11/2018 | Stuart | |
| 2020/0300119 A1 | | 9/2020 | Mason | |

OTHER PUBLICATIONS

EP Search Report for EP Patent Application No. 23213839.6 dated May 15, 2024.

* cited by examiner

*Primary Examiner* — Grant Moubry
*Assistant Examiner* — Ruben Picon-Feliciano
(74) *Attorney, Agent, or Firm* — Getz Balich LLC

(57) ABSTRACT

An assembly is provided for a turbine engine. This assembly includes a rotating structure rotatable about an axis, a stationary structure and a bearing. The stationary structure forms a bearing compartment, a buffer cavity, a low pressure cavity and a high pressure cavity with the rotating structure. The buffer cavity surrounds the bearing compartment. The low pressure cavity surrounds the buffer cavity. The high pressure cavity surrounds the low pressure cavity. The bearing is within the bearing compartment. The bearing rotatably couples the rotating structure to the stationary structure.

19 Claims, 4 Drawing Sheets

BUFFER AIR SYSTEM FOR A BEARING COMPARTMENT

GOVERNMENT LICENSE RIGHTS

This invention was made with Government support awarded by the United States. The Government has certain rights in this invention.

BACKGROUND OF THE DISCLOSURE

1. Technical Field

This disclosure relates generally to a turbine engine and, more particularly, to providing buffer air for a bearing compartment.

2. Background Information

It is known in the art to surround a bearing compartment with buffer air. Various systems and methods are known in the art for providing buffer air. While these known systems and methods have various benefits, there is still room in the art for improvement. There is a need in the art, for example, for a system which can provide buffer air at a reduced pressure during one or more modes of turbine engine operation, while not disrupting other internal air system functions requiring a continuous supply of high pressure air from a system surrounding the bearing compartment.

SUMMARY OF THE DISCLOSURE

According to an aspect of the present disclosure, an assembly is provided for a turbine engine. This assembly includes a rotating structure rotatable about an axis, a stationary structure and a bearing. The stationary structure forms a bearing compartment, a buffer cavity, a low pressure cavity and a high pressure cavity with the rotating structure. The buffer cavity surrounds the bearing compartment. The low pressure cavity surrounds the buffer cavity. The high pressure cavity surrounds the low pressure cavity. The bearing is within the bearing compartment. The bearing rotatably couples the rotating structure to the stationary structure.

According to another aspect of the present disclosure, another assembly is provided for a turbine engine. This assembly includes a rotating structure rotatable about an axis, a stationary structure and a bearing. The stationary structure includes a combustor. The stationary structure forms a bearing compartment, a buffer cavity, a low pressure cavity, a high pressure cavity and a diffuser plenum. The combustor is within the diffuser plenum. The buffer cavity is radially adjacent and extends circumferentially about the bearing compartment. The low pressure cavity is radially adjacent and extends circumferentially about the buffer cavity. The high pressure cavity is radially adjacent and extends circumferentially about the low pressure cavity. The diffuser plenum is radially adjacent and extends circumferentially about high pressure cavity. The bearing is within the bearing compartment. The bearing rotatably couples the rotating structure to the stationary structure.

According to still another aspect of the present disclosure, another assembly is provided for a turbine engine. This assembly includes a rotating structure rotatable about an axis, a stationary structure, a vent line, a valve and a bearing. The stationary structure forms a bearing compartment, a buffer cavity, a low pressure cavity and a high pressure cavity. The buffer cavity surrounds the bearing compartment. The low pressure cavity surrounds the buffer cavity. The high pressure cavity surrounds the low pressure cavity. The vent line is fluidly coupled with the low pressure cavity. The low pressure cavity is configured to direct leakage air from the high pressure cavity and buffer air from the buffer cavity into the vent line. The valve is configured to regulate airflow out of the low pressure cavity through the vent line. The bearing is within the bearing compartment. The bearing rotatably couples the rotating structure to the stationary structure.

At least one of the buffer cavity, the low pressure cavity or the high pressure cavity may be further formed by the rotating structure.

The buffer cavity may be radially adjacent and extend axially along a radial outer side of the bearing compartment. The buffer cavity may be axially adjacent and extend radially along one or more opposing axial ends of the bearing compartment.

The stationary structure may include a bearing compartment wall. The bearing compartment wall may include: a sidewall radially between and forming the bearing compartment and the buffer cavity; a first endwall projecting radially inward from the sidewall, the first endwall axially between and forming the bearing compartment and the buffer cavity; and a second endwall projecting radially inward from the sidewall, the second endwall axially between and forming the bearing compartment and the buffer cavity.

The bearing compartment wall may further include: a first endwall rim projecting axially out from the first endwall towards the second endwall, the first endwall rim radially between and forming the bearing compartment and the buffer cavity; and/or a second endwall rim projecting axially out from the second endwall towards the first endwall, the second endwall rim radially between and forming the bearing compartment and the buffer cavity.

The assembly may also include: a first seal device sealing a gap between the first endwall rim and the rotating structure; and/or a second seal device sealing a gap between the second endwall rim and the rotating structure.

The assembly may also include a plurality of seal devices. The stationary structure may include a bearing compartment wall between and forming the bearing compartment and the buffer cavity. Each of the seal devices may seal a respective gap between the bearing compartment wall and the rotating structure. The bearing compartment may be axially between the plurality of seal devices.

The low pressure cavity may be radially adjacent and extend axially along a radial outer side of the buffer cavity. The low pressure cavity may be axially adjacent and extend radially along one or more opposing axial ends of the buffer cavity.

The stationary structure may include a buffer cavity wall. The buffer cavity wall may include: a sidewall radially between and forming the buffer cavity and the low pressure cavity; a first endwall projecting radially inward from the sidewall, the first endwall axially between and forming the buffer cavity and the low pressure cavity; and a second endwall projecting radially inward from the sidewall, the second endwall axially between and forming the buffer cavity and the low pressure cavity.

The assembly may also include: a first control leakage gap formed by and radially between the first endwall and the rotating structure; and/or a second control leakage gap formed by and radially between the second endwall and the rotating structure.

The high pressure cavity may be radially adjacent and extend axially along a radial outer side of the low pressure cavity. The high pressure cavity may be axially adjacent and extend radially along one or more opposing axial ends of the low pressure cavity.

The stationary structure may include a low pressure cavity wall. The low pressure cavity wall may include: a sidewall radially between and forming the low pressure cavity and the high pressure cavity; a first endwall projecting radially inward from the sidewall, the first endwall axially between and forming the low pressure cavity and the high pressure cavity; and a second endwall projecting radially inward from the sidewall, the second endwall axially between and forming the low pressure cavity and the high pressure cavity.

The assembly may also include: a first seal device sealing a gap between the first endwall and the rotating structure; and/or a second seal device sealing a gap between the second endwall and the rotating structure.

The assembly may also include a plurality of seal devices. The stationary structure may include a low pressure cavity wall between and forming the low pressure cavity and the high pressure cavity. Each of the seal devices may seal a respective gap between the low pressure cavity wall and the rotating structure. The low pressure cavity may be axially between the seal devices.

The stationary structure may also include: a diffuser plenum surrounding the high pressure cavity; and a combustor within the within the diffuser plenum.

The high pressure cavity may be radially inboard of a core flowpath of the turbine engine.

The assembly may also include a vent line fluidly coupled with the low pressure cavity. The low pressure cavity may be configured to direct leakage air from the high pressure cavity and buffer air from the buffer cavity into the vent line.

The assembly may also include a flow regulator configured to regulate airflow out of the low pressure cavity through the vent line.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
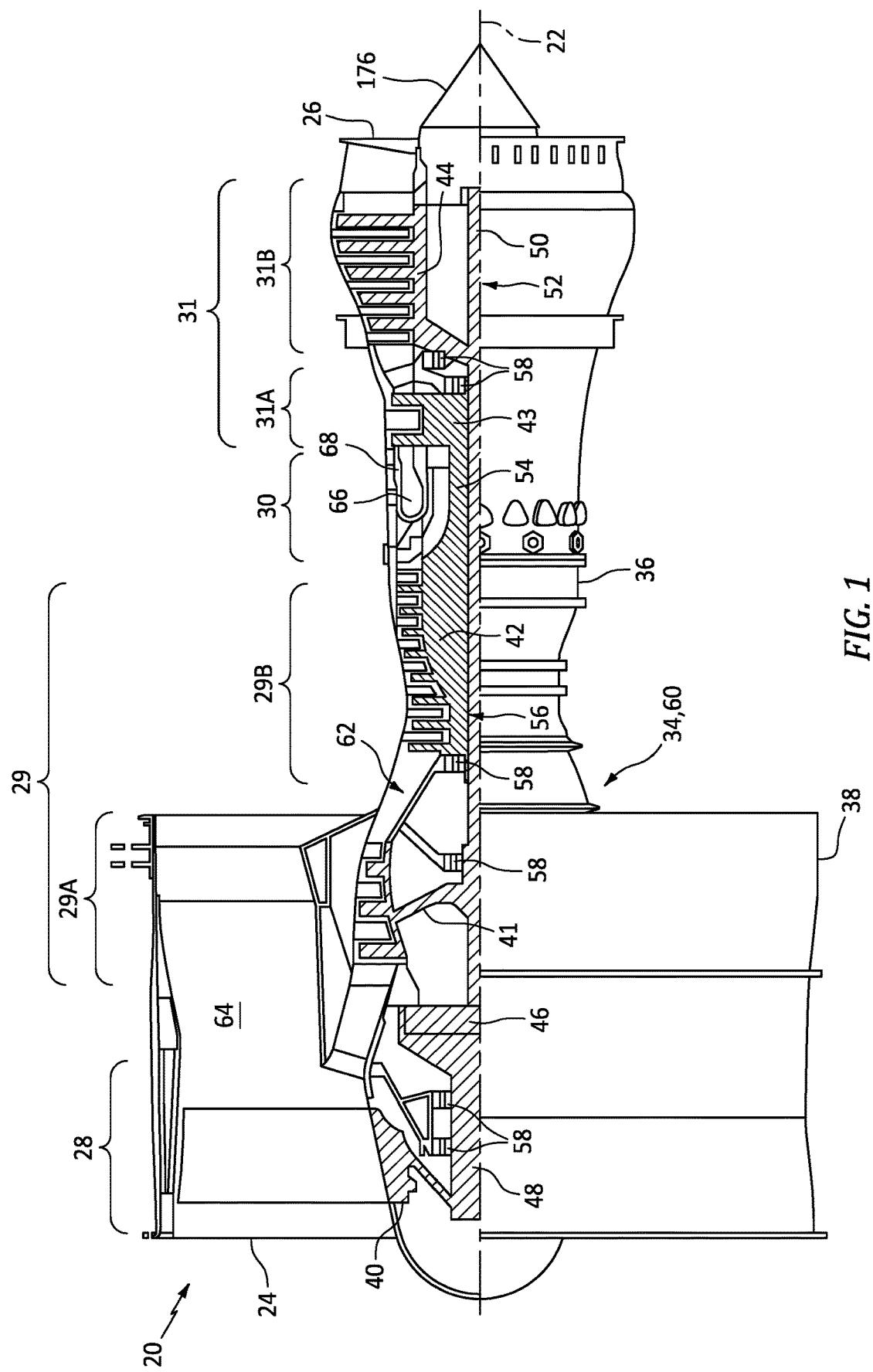
FIG. 1 is a side cutaway illustration of a gas turbine engine.

FIG. 1 is a side cutaway illustration of a gas turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., a core of the turbine engine 20. The outer case 38 may house at least the fan section 28.

Each of the engine sections 28, 29A, 29B, 31A and 31B includes a respective bladed rotor 40-44. Each of these rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 50. At least (or only) the LPC rotor 41, the LPT rotor 44 and the low speed shaft 50 may collectively form a low speed rotating structure 52; e.g., a low speed spool. The HPC rotor 42 is connected to and driven by the HPT rotor 43 through a high speed shaft 54. At least (or only) the HPC rotor 42, the HPT rotor 43 and the high speed shaft 54 may collectively form a high speed rotating structure 56; e.g., a high speed spool. Each of the engine rotating structures 52, 56 and each of the engine shafts 48, 50, 54 is rotatably support by a plurality of bearings 58, some of which are schematically shown in FIG. 1. Each of these bearings 58 is connected to the engine housing 34 by an internal engine structure; e.g., duct walls, support structures (e.g., struts, frames, etc.) and the like. At least (or only) the internal engine structure and the engine housing 34 may collectively form a stationary structure 60 of the turbine engine 20.

During operation, air enters the turbine engine 20 through the airflow inlet 24. This air is directed through the fan section 28 and into a core flowpath 62 and a bypass flowpath 64. The core flowpath 62 extends sequentially through the LPC section 29A, the HPC section 29B, the combustor section 30, the HPT section 31A and the LPT section 31B; e.g., the engine core. The air within the core flowpath 62 may be referred to as "core air". The bypass flowpath 64 extends through a bypass duct, which bypasses the engine core. The air within the bypass flowpath 64 may be referred to as "bypass air".

The core air is compressed by the LPC rotor 41 and the HPC rotor 42 and directed into a combustion chamber 66 of a (e.g., annular) combustor 68 in the combustor section 30. Fuel is injected into the combustion chamber 66 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which fan rotor 40 propels bypass air through and out of the bypass flowpath 64. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

Figure 2:
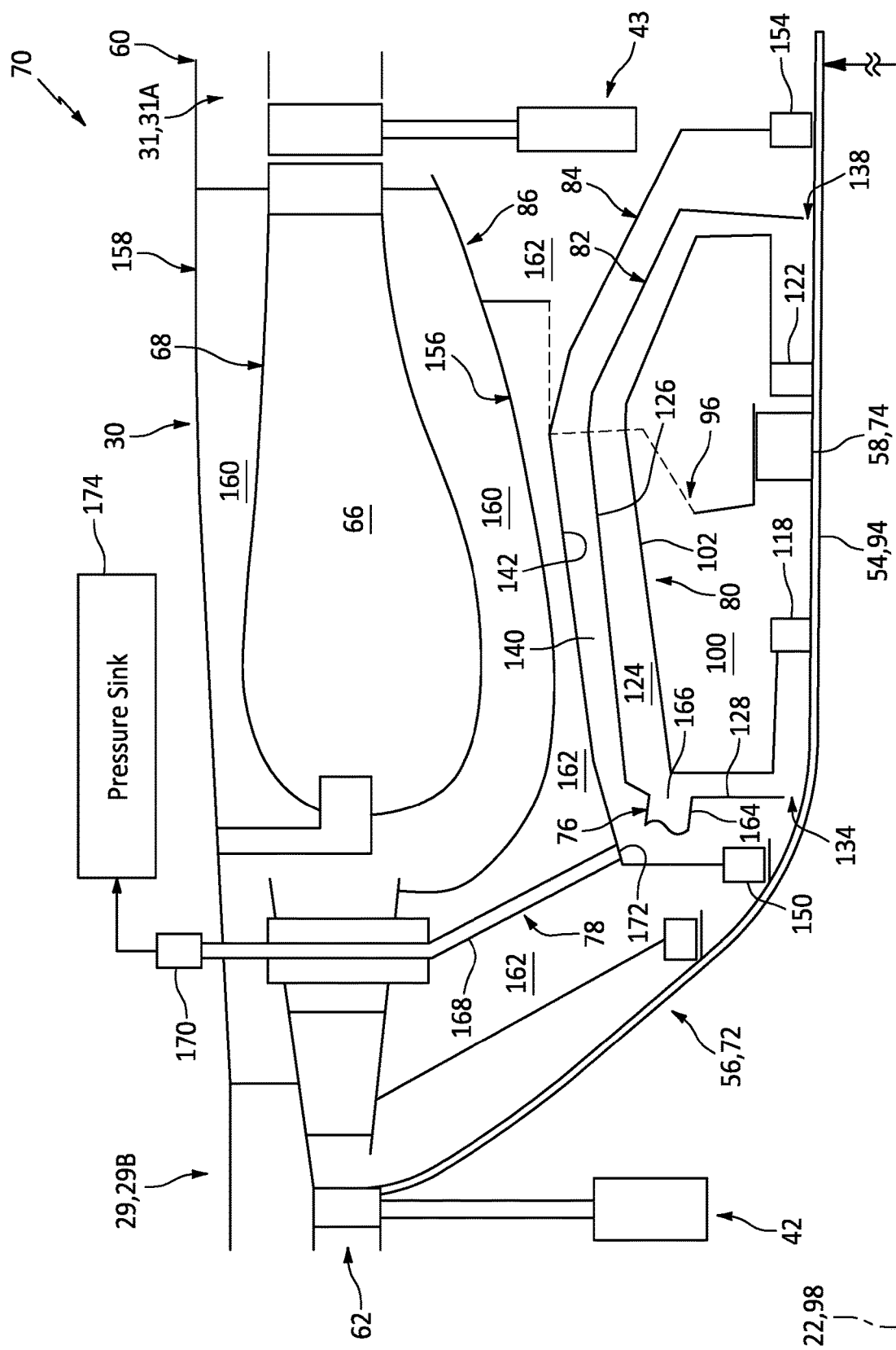
FIG. 2 is a partial schematic illustration of an engine assembly.

FIG. 2 illustrates an assembly 70 for the turbine engine 20. This engine assembly 70 includes an engine rotating structure 72 (e.g., the high speed rotating structure 56), an engine bearing 74 (e.g., one of the bearings 58), the stationary structure 60, a buffer air system 76 and an air relief system 78. The stationary structure 60 of FIG. 2 includes a bearing compartment wall 80, a buffer cavity wall 82, a low pressure (LP) cavity wall 84, a diffuser structure 86 and the combustor 68.

Figure 3:
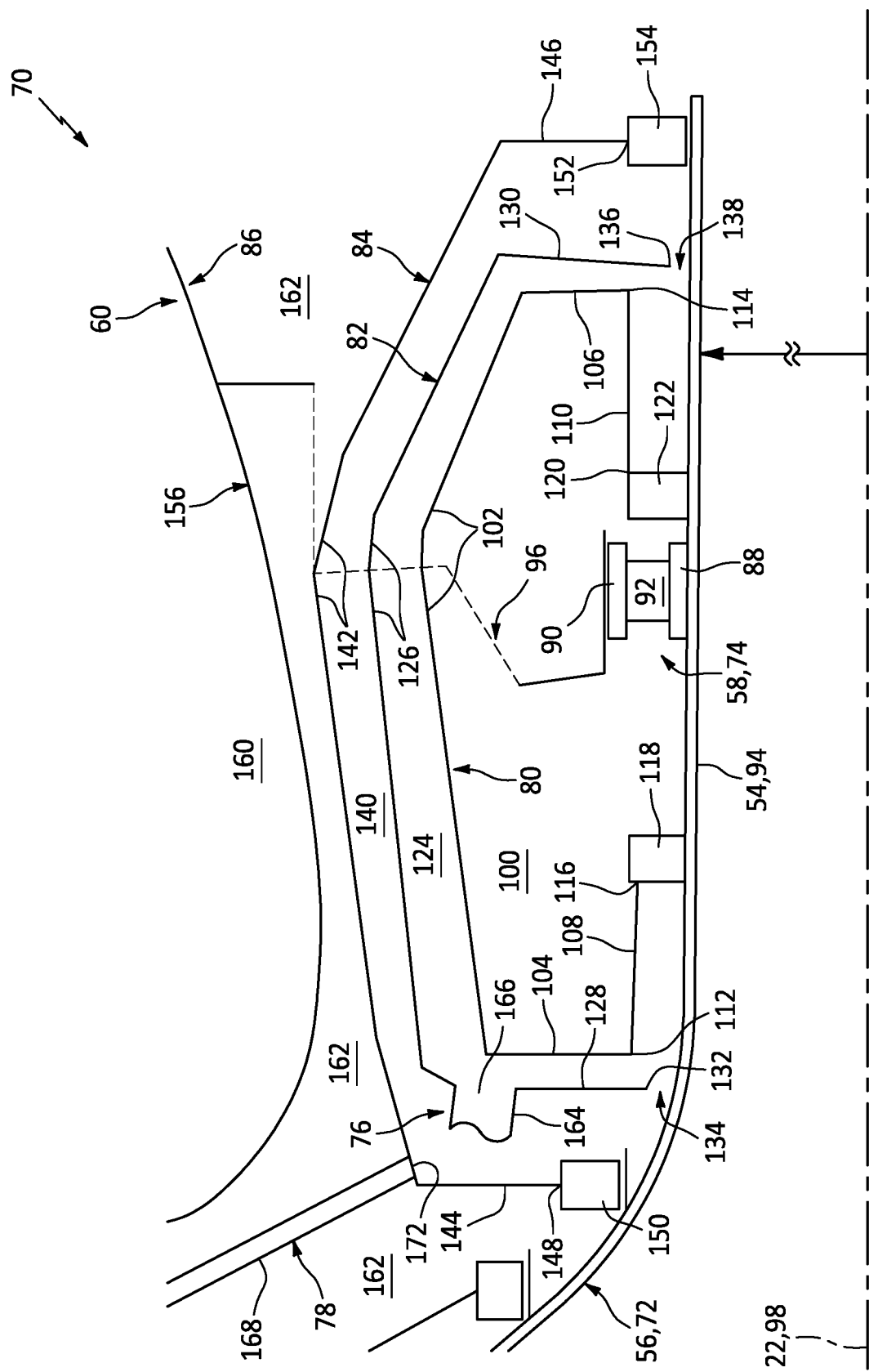
FIG. 3 is a schematic illustration of a portion of the engine assembly.

Referring to FIG. 3, the engine bearing 74 is configured to rotatably couple the engine rotating structure 72 to the stationary structure 60. The stationary structure 60 may thereby rotatably support the engine rotating structure 72 through the engine bearing 74. Examples of the engine bearing 74 include, but are not limited to, a rolling element bearing and/or a thrust bearing. The engine bearing 74 of FIG. 3, for example, includes a bearing inner race 88, a bearing outer race 90 and a plurality of bearing elements 92. The inner race 88 is mounted onto the engine rotating structure 72; e.g., onto a shaft 94 (e.g., the high speed shaft 54) of the engine rotating structure 72. The outer race 90 circumscribes the inner race 88 and is mounted to a bearing support 96 of the stationary structure 60. The bearing elements 92 are distributed circumferentially around a rotational axis 98 (e.g., the axial centerline 22) of the engine rotating structure 72 in a circular array. This array of the bearing elements 92 is disposed radially between and engaged with (e.g., contacts, rolls along, etc.) the inner race 88 and the outer race 90.

The bearing compartment wall 80 is configured to form a bearing compartment 100 in which the engine bearing 74 is housed. The bearing compartment wall 80 of FIG. 3, for example, forms a radial outer peripheral boundary of the bearing compartment 100. The bearing compartment wall 80 may also form one or more axial end peripheral boundaries of the bearing compartment 100. An inner peripheral boundary of the bearing compartment 100, however, may be formed by a combination of the bearing compartment wall 80 and the engine rotating structure 72 and its engine shaft 94. In other embodiments, it is contemplated the inner peripheral boundary of the bearing compartment 100 may be (e.g., completely) formed by the engine rotating structure 72 and its engine shaft 94 and/or otherwise formed without the bearing compartment wall 80. The bearing compartment wall 80 of FIG. 3 includes a bearing compartment sidewall 102, a bearing compartment first endwall 104 and a bearing compartment second endwall 106. The bearing compartment 100 may also include a bearing compartment first endwall rim 108 ("first rim") and/or a bearing compartment second endwall rim 110 ("second rim").

The sidewall 102 is disposed at and/or along a radial outer side of the bearing compartment 100. The sidewall 102 extends axially along the rotational axis 98 between and to the first endwall 104 and the second endwall 106. The sidewall 102 extends circumferentially about (e.g., completely around) the rotational axis 98. The sidewall 102 may thereby circumscribe the engine rotating structure 72 and form the radial outer peripheral boundary of the bearing compartment 100. The sidewall 102 of FIG. 3 has a non-straight (e.g., curved, bowed, bent, convex, splined, etc.) sectional geometry when viewed, for example, in a reference plane parallel with (e.g., including) the rotational axis 98; e.g., plane of FIG. 3. The present disclosure, however, is not limited to such an exemplary bearing compartment sidewall geometry.

The first endwall 104 is disposed at and/or along an axial first end of the bearing compartment 100. The first endwall 104 is connected to (e.g., formed integral with or attached to) the sidewall 102. The first endwall 104 of FIG. 3 projects radially inward (towards the rotational axis 98) from the sidewall 102 to a distal inner end 112 of the first endwall 104, which distal inner end 112 is spaced radially outboard of the engine rotating structure 72 by a gap; e.g., an air gap. The first endwall 104 extends circumferentially about (e.g., completely around) the rotational axis 98. The first endwall 104 may thereby circumscribe the engine rotating structure 72 and form the first axial end peripheral boundary of the bearing compartment 100.

The second endwall 106 is disposed at and/or along an axial second end of the bearing compartment 100. The second endwall 106 is connected to (e.g., formed integral with or attached to) the sidewall 102. The second endwall 106 of FIG. 3 projects radially inward (towards the rotational axis 98) from the sidewall 102 to a distal inner end 114 of the second endwall 106. This distal inner end 114 is spaced radially outboard of the engine rotating structure 72 by a gap; e.g., an air gap. The second endwall 106 extends circumferentially about (e.g., completely around) the rotational axis 98. The second endwall 106 may thereby circumscribe the engine rotating structure 72 and form the second axial end peripheral boundary of the bearing compartment 100.

The first rim 108 is disposed at and/or along a radial inner side of the bearing compartment 100. The first rim 108 is connected to (e.g., formed integral with or attached to) the first endwall 104. The first rim 108 of FIG. 3 projects axially out from the first endwall 104, along the rotational axis 98 and the engine rotating structure 72 towards the second endwall 106 and/or the second rim 110, to a distal end 116 of the first rim 108. The first rim 108 is spaced radially outboard from the engine rotating structure 72 by a gap; e.g., an air gap. The first rim 108 extends circumferentially about (e.g., completely around) the rotational axis 98. The first rim 108 may thereby circumscribe the engine rotating structure 72.

A bearing compartment first seal device 118 is arranged with the bearing compartment wall 80 and its first rim 108 at (e.g., on, adjacent or proximate) the distal end 116 of the first rim 108. This first seal device 118 is configured to seal an annular gap between (a) the bearing compartment wall 80 and its first rim 108 and (b) the engine rotating structure 72. Examples of the first seal device 118 include, but are not limited to, a face seal device and a carbon seal device.

The second rim 110 is disposed at and/or along the radial inner side of the bearing compartment 100. The second rim 110 is connected to (e.g., formed integral with or attached to) the second endwall 106. The second rim 110 of FIG. 3 projects axially out from the second endwall 106, along the rotational axis 98 and the engine rotating structure 72 towards the first endwall 104 and/or the first rim 108, to a distal end 120 of the second rim 110. The second rim 110 is spaced radially outboard from the engine rotating structure 72 by a gap; e.g., an air gap. The second rim 110 extends circumferentially about (e.g., completely around) the rotational axis 98. The second rim 110 may thereby circumscribe the engine rotating structure 72.

A bearing compartment second seal device 122 is arranged with the bearing compartment wall 80 and its second rim 110 at (e.g., on, adjacent or proximate) the distal end 120 of the second rim 110. This second seal device 122 is configured to seal an annular gap between (a) the bearing compartment wall 80 and its second rim 110 and (b) the engine rotating structure 72. Examples of the second seal device 122 include, but are not limited to, a face seal device and a carbon seal device.

With the foregoing arrangement, the bearing compartment 100 is arranged and extends axially between and to the first endwall 104 and the second endwall 106. The bearing compartment 100 is also arranged and extends axially between and to axially the first seal device 118 and the second seal device 122, where the engine bearing 74 is arranged axially between the first seal device 118 and the second seal device 122. A first end portion of the bearing compartment 100 is arranged and extends radially between and to the first rim 108 and the sidewall 102. A second end portion of the bearing compartment 100 is arranged and extends radially between and to the second rim 110 and the sidewall 102. An intermediate portion of the bearing compartment 100 is arranged and extends radially between and to the engine rotating structure 72 and the sidewall 102. This bearing compartment 100 further extends circumferentially about (e.g., completely around) the rotational axis 98. The bearing compartment 100 may thereby circumscribe the engine rotating structure 72 and its engine shaft 94.

The buffer cavity wall 82 is configured to form a buffer cavity 124. The buffer cavity wall 82 of FIG. 3, for example, forms a radial outer peripheral boundary of the buffer cavity 124. The buffer cavity wall 82 may also form one or more axial end peripheral boundaries of the buffer cavity 124. An inner peripheral boundary of the buffer cavity 124, however, may be formed by a combination of the bearing compartment wall 80 and the engine rotating structure 72 and its engine shaft 94. The buffer cavity wall 82 of FIG. 3 includes a buffer cavity sidewall 126, a buffer cavity first endwall 128 and a buffer cavity second endwall 130.

The sidewall 126 is disposed at and/or along a radial outer side of the buffer cavity 124. The sidewall 126 extends axially along the rotational axis 98 between and to the first endwall 128 and the second endwall 130. The sidewall 126 extends circumferentially about (e.g., completely around) the rotational axis 98. The sidewall 126 may thereby circumscribe the engine rotating structure 72 and the sidewall 102, and form the radial outer peripheral boundary of the buffer cavity 124. The sidewall 126 of FIG. 3 has a non-straight (e.g., curved, bowed, bent, convex, splined, etc.) sectional geometry when viewed, for example, in the reference plane; e.g., the plane of FIG. 3. The present disclosure, however, is not limited to such an exemplary buffer cavity sidewall geometry.

The first endwall 128 is disposed at and/or along an axial first end of the buffer cavity 124. The first endwall 128 is connected to (e.g., formed integral with or attached to) the sidewall 126. The first endwall 128 of FIG. 3 projects radially inward (towards the rotational axis 98) from the sidewall 126 to a distal inner end 132 of the first endwall 128. This distal inner end 132 is spaced radially outboard of the engine rotating structure 72, which may provide a (e.g., annular) first control leakage gap 134 radially between the first endwall 128 and the engine rotating structure 72. The first endwall 128 extends circumferentially about (e.g., completely around) the rotational axis 98. The first endwall 128 may thereby circumscribe the engine rotating structure 72 and form the first axial end peripheral boundary of the buffer cavity 124.

The second endwall 130 is disposed at and/or along an axial second end of the buffer cavity 124. The second endwall 130 is connected to (e.g., formed integral with or attached to) the sidewall 126. The second endwall 130 of FIG. 3 projects radially inward (towards the rotational axis 98) from the sidewall 126 to a distal inner end 136 of the second endwall 130. This distal inner end 136 is spaced radially outboard of the engine rotating structure 72, which may provide a (e.g., annular) second control leakage gap 138 radially between the second endwall 130 and the engine rotating structure 72. The second endwall 130 extends circumferentially about (e.g., completely around) the rotational axis 98. The second endwall 130 may thereby circumscribe the engine rotating structure 72 and form the second axial end peripheral boundary of the buffer cavity 124.

With the foregoing arrangement, the buffer cavity 124 is arranged axially between the first endwall 128 and the second endwall 130. The buffer cavity 124 is arranged radially between the sidewall 126 and the engine rotating structure 72 and its engine shaft 94. This buffer cavity 124 further extends circumferentially about (e.g., completely around) the rotational axis 98. The buffer cavity 124 may thereby circumscribe the engine rotating structure 72 and its engine shaft 94 as well as the bearing compartment wall 80. The buffer cavity 124 of FIG. 3 therefore surrounds (in a radial direction and/or an axial direction) the bearing compartment 100. In particular, an outer portion of the buffer cavity 124 extends radially between and to the sidewall 102 and the sidewall 126. A first end portion of the buffer cavity 124 extends axially between and to the first endwall 104 and the first endwall 128. A second end portion of the buffer cavity 124 extends axially between and to the second endwall 106 and the second endwall 130. A first inner portion of the buffer cavity 124 extends radially between and to the first rim 108 and the engine rotating structure 72 and its engine shaft 94. This first inner portion also extend axially between and to the first seal device 118 and the first endwall 128 and its first control leakage gap 134. A second inner portion of the buffer cavity 124 extends radially between and to the second rim 110 and the engine rotating structure 72 and its engine shaft 94. This second inner portion also extend axially between and to the second seal device 122 and the second endwall 130 and its second control leakage gap 138.

The LP cavity wall 84 is configured to form a low pressure (LP) cavity 140. The LP cavity wall 84 of FIG. 3, for example, forms a radial outer peripheral boundary of the LP cavity 140. The LP cavity wall 84 may also form one or more axial end peripheral boundaries of the LP cavity 140. An inner peripheral boundary of the LP cavity 140, however, may be formed by a combination of the buffer cavity wall 82 and the engine rotating structure 72 and its engine shaft 94. The LP cavity wall 84 of FIG. 3 includes a low pressure (LP) cavity sidewall 142, a low pressure (LP) cavity first endwall 144 and a low pressure (LP) cavity second endwall 146.

The sidewall 142 is disposed at and/or along a radial outer side of the LP cavity 140. The sidewall 142 extends axially along the rotational axis 98 between and to the first endwall 144 and the second endwall 146. The sidewall 142 extends circumferentially about (e.g., completely around) the rotational axis 98. The sidewall 142 may thereby circumscribe the engine rotating structure 72, the sidewall 126 and the sidewall 102, and form the radial outer peripheral boundary of the LP cavity 140. The sidewall 142 of FIG. 3 has a non-straight (e.g., curved, bowed, bent, convex, splined, etc.) sectional geometry when viewed, for example, in the reference plane; e.g., the plane of FIG. 3. The present disclosure, however, is not limited to such an exemplary LP cavity sidewall geometry.

The first endwall 144 is disposed at and/or along an axial first end of the LP cavity 140. The first endwall 144 is connected to (e.g., formed integral with or attached to) the sidewall 142. The first endwall 144 of FIG. 3 projects radially inward (towards the rotational axis 98) from the sidewall 142 to a distal inner end 148 of the first endwall 144. This distal inner end 148 is spaced radially outboard of the engine rotating structure 72. The first endwall 144 extends circumferentially about (e.g., completely around) the rotational axis 98. The first endwall 144 may thereby circumscribe the engine rotating structure 72.

A low pressure (LP) cavity first seal device 150 is arranged with the LP cavity wall 84 and its first endwall 144 at (e.g., on, adjacent or proximate) the distal end 148 of the first endwall 144. This first seal device 150 is configured to seal an annular gap between (a) the LP cavity wall 84 and its first endwall 144 and (b) the engine rotating structure 72. Examples of the first seal device 150 include, but are not limited to, a face seal device, a carbon seal device, a brush seal device, a circumferentially segmented seal device, a KE seal device, a controlled gap seal device and a non-contact seal device. Examples of the non-contact seal device include, but are not limited to, a hydrostatic non-contact seal device and a hydrodynamic non-contact seal device.

The second endwall 146 is disposed at and/or along an axial second end of the LP cavity 140. The second endwall 146 is connected to (e.g., formed integral with or attached to) the sidewall 142. The second endwall 146 of FIG. 3 projects radially inward (towards the rotational axis 98) from the sidewall 142 to a distal inner end 152 of the second endwall 146. This distal inner end 152 is spaced radially outboard of the engine rotating structure 72. The second endwall 146 extends circumferentially about (e.g., completely around) the rotational axis 98. The second endwall 146 may thereby circumscribe the engine rotating structure 72.

A low pressure (LP) cavity second seal device 154 is arranged with the LP cavity wall 84 and its second endwall 146 at (e.g., on, adjacent or proximate) the distal end 152 of the second endwall 146. This second seal device 154 is configured to seal an annular gap between (a) the LP cavity wall 84 and its second endwall 146 and (b) the engine rotating structure 72. Examples of the second seal device 154 include, but are not limited to, a face seal device, a carbon seal device, a brush seal device, a circumferentially segmented seal device, a KE seal device, a controlled gap seal device and a non-contact seal device. Examples of the non-contact seal device include, but are not limited to, a hydrostatic non-contact seal device and a hydrodynamic non-contact seal device.

With the foregoing arrangement, the LP cavity 140 is arranged axially between the first endwall 144 and the second endwall 146. The LP cavity 140 is arranged radially between the sidewall 142 and the engine rotating structure 72 and its engine shaft 94. This LP cavity 140 further extends circumferentially about (e.g., completely around) the rotational axis 98. The LP cavity 140 may thereby circumscribe the engine rotating structure 72 and its engine shaft 94 as well as the bearing compartment wall 80 and the buffer cavity wall 82. The LP cavity 140 of FIG. 3 therefore surrounds (in a radial direction and/or an axial direction) the bearing compartment 100 and the buffer cavity 124. In particular, an outer portion of the LP cavity 140 extends radially between and to the sidewall 126 and the sidewall 142. A first end portion of the LP cavity 140 extends axially between and to the first endwall 128 and the first endwall 144. This first end portion also extends axially between and to (or about) the first control leakage gap 134 and the first seal device 150. A second end portion of the LP cavity 140 extends axially between and to the second endwall 130 and the second endwall 146. This second end portion also extends axially between and to (or about) the second control leakage gap 138 and the second seal device 154.

Referring to FIG. 2, the diffuser structure 86 includes an inner diffuser case 156, an outer diffuser case 158 and a diffuser plenum 160. The inner diffuser case 156 extends axially along the rotational axis 98, and may axially overlap at least a portion (or an entirety of) the LP cavity wall 84. The inner diffuser case 156 extends circumferentially about (e.g., completely around) the rotational axis 98. The inner diffuser case 156 may thereby circumscribe the engine rotating structure 72, the sidewall 142, the sidewall 126 and the sidewall 102. This inner diffuser case 156 is also spaced radially outboard from the LP cavity wall 84 and its sidewall 142. The outer diffuser case 158 extends axially along the rotational axis 98, and may axially overlap at least a portion (or an entirety of) the inner diffuser case 156. The outer diffuser case 158 extends circumferentially about (e.g., completely around) the rotational axis 98. The outer diffuser case 158 may thereby circumscribe the inner diffuser case 156. This outer diffuser case 158 is also spaced radially outboard from the inner diffuser case 156. The diffuser plenum 160 may thereby be arranged radially between and formed by the inner diffuser case 156 and the outer diffuser case 158. This diffuser plenum 160 extends circumferentially about (e.g., completely around) the rotational axis 98.

With the foregoing arrangement, the stationary structure 60 and the engine rotating structure 72 may collectively form a high pressure (HP) cavity 162. This HP cavity 162 is arranged and extends radially between and to the LP cavity wall 84 and the inner diffuser case 156. The HP cavity 162 may (e.g., radially and/or axially) surround the LP cavity wall 84 and the LP cavity 140. The LP cavity wall 84 of FIG. 2, for example, is disposed radially and/or axially within the HP cavity 162.

The combustor 68 is disposed within the diffuser plenum 160. Here, the diffuser plenum 160 may receive compressed air from the HPC section 29B. The compressed air is diffused within the diffuser plenum 160, and the diffused air is directed into the combustor 68 and its combustion chamber 66 for mixing with the fuel and subsequent combustion. Thus, the core flowpath 62 is located radially outboard of the HP cavity 162, the LP cavity 140, the buffer cavity 124 and the bearing compartment 100.

The buffer air system 76 is configured to deliver (e.g., relatively cool, high pressure) buffer air to the buffer cavity 124. This buffer air may be air bled from the core flowpath 62 out of the compressor section 29 (e.g., the HPC section 29B), and then run through a heat exchanger (e.g., a cooler). The buffer air system 76 of FIG. 2 includes a buffer air conduit 164 (e.g., a pipe, a hose, etc.) which directs the buffer air into the buffer cavity 124. The buffer air conduit 164, for example, may be fluidly coupled with a port 166 in the buffer cavity wall 82 and its first endwall 128.

The air relief system 78 is configured to regulate fluid pressure (e.g., air pressure) within the LP cavity 140 and, thus, the fluidly coupled buffer cavity 124. The air relief system 78 of FIG. 2, for example, includes a vent line 168 (e.g., a conduit) and a flow regulator 170 (e.g., a valve). The vent line 168 is fluidly coupled with a port 172 in the LP cavity wall 84 and its sidewall 142 (or the first endwall 144 of FIG. 3), and extends to the flow regulator 170. The flow regulator 170 is fluidly coupled between the vent line 168 and a pressure sink 174; e.g., the bypass flowpath 64 (see FIG. 1), an environment external to the turbine engine 20, a tail cone 176 for the turbine engine 20 (see FIG. 1), etc. The flow regulator 170 may be configured to adjust airflow out of the LP cavity 140 through the vent line 168 based on a mode of engine operation. For example, during an intermediate engine power setting (e.g., aircraft cruise), the flow regulator 170 may prevent or reduce the airflow vented to the pressure sink 174 from the LP cavity 140. This may reduce losses and, thus, increase engine efficiency at the intermediate engine power setting. However, during a high engine power setting (e.g., aircraft takeoff), the flow regulator 170 may increase the airflow vented to the pressure sink 174 from the LP cavity 140. This may reduce air pressure within the LP cavity 140 as well as the buffer cavity 124, which may reduce parasitic losses (e.g., drag) on the engine rotating structure 72 and its engine shaft 94. It is believed the reduction is parasitic losses will outweigh any efficiency losses due to the increased venting. Reducing the air pressure within the buffer cavity 124 also reduces pressure forces on (e.g., pressure differential across) the seal devices 118 and 122. In addition or alternatively, during a low engine power setting (e.g., aircraft landing, aircraft taxiing, etc.), the flow regulator 170 may also reduce the airflow vented to the pressure sink 174 from the LP cavity 140 to ensure, for example, minimum flow requirements across the seal devices 118 and 122 are met; e.g., to prevent backflow across the seal devices 118 and 122. To facilitate the foregoing flow regulator operation, actuation of the flow regulator 170 may be controlled by a control system (e.g., a FADEC) for the turbine engine 20.

Figure 4:
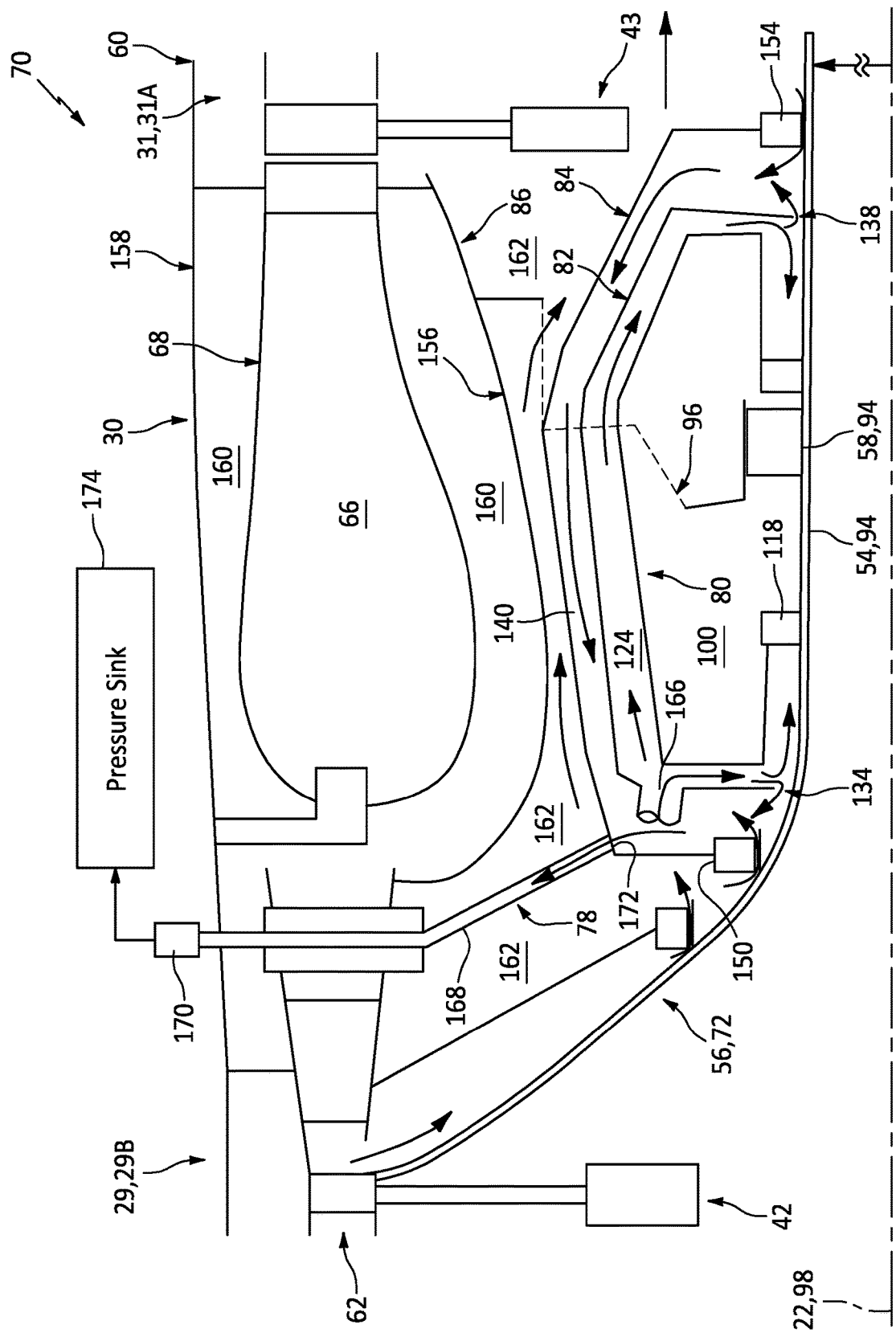
FIG. 4 is a partial schematic illustration of the engine assembly with flow arrows for a mode of operation.

Referring to FIG. 4, during operation of the engine assembly 70, high pressure core air is bled from the core flowpath 62 and directed into the HP cavity 162. A majority of this high pressure bleed air may pass through the HP cavity 162 for routing to one or more other areas of the turbine engine 20; e.g., to a turbine rotor for cooling, etc. Some of the high pressure bleed air, however, may leak across one or more of the seal devices 150 and 154 into the LP cavity 140. Concurrently, the buffer air is directed into the buffer cavity 124 from the buffer air system 76 and its buffer air conduit 164. This buffer air provides an insulative barrier between the relatively cool air in the bearing compartment 100 and the relatively hot bleed air in the HP cavity 162. The buffer air flows through the buffer cavity 124 and is directed into the LP cavity 140 through one or more of the control leakage gaps 134 and 138. The buffer air and the bleed air in the LP cavity 140 combine to provide low pressure (LP) air. This LP air flows within the LP cavity 140 and its selectively vented through the air relief system 78.

The engine assembly 70 is described above in relation to the combustion section and its diffuser structure 86. It is contemplated, however, the engine assembly 70 may alternatively be configured for other sections of the turbine engine 20; e.g., within the turbine section 31. The present disclosure therefore is not limited to the exemplary arrangement of FIGS. 2-4.

The engine assembly 70 may be included in various turbine engines other than the exemplary gas turbine engine described above. The engine assembly 70, for example, may be included in a geared turbine engine where a geartrain connects one or more shafts to one or more rotors in a fan section, a compressor section and/or any other engine section. Alternatively, the engine assembly 70 may be included in a turbine engine configured without a geartrain; e.g., a direct drive turbine engine. The engine assembly 70 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   a rotating structure rotatable about an axis;
   a stationary structure forming a bearing compartment, a buffer cavity, a low pressure cavity and a high pressure cavity with the rotating structure, the buffer cavity surrounding the bearing compartment, the low pressure cavity surrounding the buffer cavity, and the high pressure cavity surrounding the low pressure cavity, wherein the buffer cavity is radially outboard of and adjacent a radial outer side of the bearing compartment, and the buffer cavity extends axially along the radial outer side of the bearing compartment; and
   a bearing within the bearing compartment, the bearing rotatably coupling the rotating structure to the stationary structure.

2. The assembly of claim 1, wherein
   the buffer cavity is axially adjacent and extends radially along a first axial end of the bearing compartment; and
   the buffer cavity is axially adjacent and extends radially along a second axial end of the bearing compartment which is axially opposite the first axial end of the bearing compartment.

3. The assembly of claim 1, wherein the stationary structure includes a bearing compartment wall, and the bearing compartment wall includes
   a sidewall radially between and forming the bearing compartment and the buffer cavity;
   a first endwall projecting radially inward from the sidewall, the first endwall axially between and forming the bearing compartment and the buffer cavity; and
   a second endwall projecting radially inward from the sidewall, the second endwall axially between and forming the bearing compartment and the buffer cavity.

4. The assembly of claim 3, wherein the bearing compartment wall further includes at least one of
   a first endwall rim projecting axially out from the first endwall towards the second endwall, the first endwall rim radially between and forming the bearing compartment and the buffer cavity; or
   a second endwall rim projecting axially out from the second endwall towards the first endwall, the second endwall rim radially between and forming the bearing compartment and the buffer cavity.

5. The assembly of claim 4, further comprising at least one of:
- a first seal device sealing a gap between the first endwall rim and the rotating structure; or
- a second seal device sealing a gap between the second endwall rim and the rotating structure.

6. The assembly of claim 1, further comprising:
- a plurality of seal devices;
- the stationary structure including a bearing compartment wall between and forming the bearing compartment and the buffer cavity;
- each of the plurality of seal devices sealing a respective gap between the bearing compartment wall and the rotating structure; and
- the bearing compartment axially between the plurality of seal devices.

7. The assembly of claim 1, wherein
- the low pressure cavity is radially adjacent and extends axially along a radial outer side of the buffer cavity; and
- the low pressure cavity is axially adjacent and extends radially along one or more opposing axial ends of the buffer cavity.

8. The assembly of claim 1, wherein the stationary structure includes a buffer cavity wall, and the buffer cavity wall includes
- a sidewall radially between and forming the buffer cavity and the low pressure cavity;
- a first endwall projecting radially inward from the sidewall, the first endwall axially between and forming the buffer cavity and the low pressure cavity; and
- a second endwall projecting radially inward from the sidewall, the second endwall axially between and forming the buffer cavity and the low pressure cavity.

9. The assembly of claim 8, wherein at least one of
- a first control leakage gap formed by and radially between the first endwall and the rotating structure; or
- a second control leakage gap formed by and radially between the second endwall and the rotating structure.

10. The assembly of claim 1, wherein
- the high pressure cavity is radially adjacent and extends axially along a radial outer side of the low pressure cavity; and
- the high pressure cavity is axially adjacent and extends radially along one or more opposing axial ends of the low pressure cavity.

11. The assembly of claim 1, wherein the stationary structure includes a low pressure cavity wall, and the low pressure cavity wall includes
- a sidewall radially between and forming the low pressure cavity and the high pressure cavity;
- a first endwall projecting radially inward from the sidewall, the first endwall axially between and forming the low pressure cavity and the high pressure cavity; and
- a second endwall projecting radially inward from the sidewall, the second endwall axially between and forming the low pressure cavity and the high pressure cavity.

12. The assembly of claim 11, further comprising at least one of:
- a first seal device sealing a gap between the first endwall and the rotating structure; or
- a second seal device sealing a gap between the second endwall and the rotating structure.

13. The assembly of claim 1, further comprising:
- a plurality of seal devices;
- the stationary structure including a low pressure cavity wall between and forming the low pressure cavity and the high pressure cavity;
- each of the plurality of seal devices sealing a respective gap between the low pressure cavity wall and the rotating structure; and
- the low pressure cavity axially between the plurality of seal devices.

14. The assembly of claim 1, wherein the stationary structure further includes
- a diffuser plenum surrounding the high pressure cavity; and
- a combustor within the diffuser plenum.

15. The assembly of claim 1, wherein the high pressure cavity is radially inboard of a core flowpath of the turbine engine.

16. The assembly of claim 1, further comprising:
- a vent line fluidly coupled with the low pressure cavity;
- the low pressure cavity configured to direct leakage air from the high pressure cavity and buffer air from the buffer cavity into the vent line.

17. The assembly of claim 16, further comprising a flow regulator configured to regulate airflow out of the low pressure cavity through the vent line.

18. An assembly for a turbine engine, comprising:
- a rotating structure rotatable about an axis;
- a stationary structure comprising a combustor, the stationary structure forming a bearing compartment, a buffer cavity, a low pressure cavity, a high pressure cavity and a diffuser plenum, the combustor within the diffuser plenum, the buffer cavity radially outboard of and adjacent the bearing compartment, the buffer cavity extending circumferentially about the bearing compartment, the low pressure cavity radially adjacent and extending circumferentially about the buffer cavity, the high pressure cavity radially adjacent and extending circumferentially about the low pressure cavity, and the diffuser plenum radially adjacent and extending circumferentially about high pressure cavity; and
- a bearing within the bearing compartment, the bearing rotatably coupling the rotating structure to the stationary structure.

19. The assembly of claim 18, wherein at least one of the buffer cavity, the low pressure cavity or the high pressure cavity is further formed by the rotating structure.

* * * * *